United States Patent [19]

Weber et al.

[11] Patent Number: 5,630,771

[45] Date of Patent: May 20, 1997

[54] COARSE AND FINE DRIVES FOR AN OBJECTIVE

[75] Inventors: Uwe Weber; Werner Flöther, both of Aalen, Germany

[73] Assignee: Carl-Zeiss-Stiftung, Heidenheim, Germany

[21] Appl. No.: 406,412

[22] Filed: Mar. 20, 1995

[30] Foreign Application Priority Data

Mar. 31, 1994 [DE] Germany ............... 44 11 208.4

[51] Int. Cl.$^6$ ................................. F16H 57/08
[52] U.S. Cl. ............... 475/338; 475/339; 475/349; 475/288; 359/822; 359/823
[58] Field of Search ............... 475/288, 289, 475/311, 312, 338, 339, 346, 349; 354/195; 359/822, 823

[56] References Cited

U.S. PATENT DOCUMENTS

| | | | |
|---|---|---|---|
| 3,015,973 | 1/1962 | Doerries | 475/339 X |
| 3,904,275 | 9/1975 | Noguchi et al. | 359/823 X |
| 3,997,245 | 12/1976 | Uesugi | 359/823 X |
| 4,416,513 | 11/1983 | Uesugi | 354/195.1 X |
| 4,898,453 | 2/1990 | Hohenecker | 359/822 |
| 5,376,057 | 12/1994 | Cooper et al. | 475/339 X |
| 5,472,387 | 12/1995 | Kamlukin | 475/339 X |

Primary Examiner—Charles A. Marmor
Assistant Examiner—Peter Kwon
Attorney, Agent, or Firm—Walter Ottesen

[57] ABSTRACT

The invention is directed to an arrangement for displacing the parts of an objective with at least one adjusting ring 6. A fine adjusting ring 40 is also provided and there is no switchover device which must be actuated by the operator. The fine adjusting ring 40 is at standstill when it is not actively rotated by the operator. A coarse adjusting ring 6 is rotatably journalled in the housing 10 of an objective. A transmission or gearing for suitably fine adjusting this coarse adjusting ring 6 includes a sun gear wheel 1 mounted fixedly on the objective housing 10, a fine adjusting ring 40 which includes a shaft pin 4 on which planetary gear wheels 2 are journalled and an output gear wheel 3 rotatably mounted on the coarse adjusting ring 6 via a slip clutch 5.

6 Claims, 1 Drawing Sheet

COARSE AND FINE DRIVES FOR AN OBJECTIVE

FIELD OF THE INVENTION

The invention relates to an arrangement for displacing at least one part of an objective with at least one adjusting ring and also relates to a transmission for the fine displacement of a coarse adjusting ring. The coarse adjusting ring is rotatably journalled in the housing of the objective.

BACKGROUND OF THE INVENTION

It is known to selectively derive a movement of an objective from two different drive sources such as a motor and a manual adjusting ring. U.S. Pat. No. 4,200,377 discloses a focusing mechanism for a camera objective wherein the drives are decoupled via a slip clutch. Published German patent application 4,331,650 discloses a planetary transmission. The inactive drive is brought to standstill by the action of a friction brake.

A manual focusing by adjusting the object spacing (object to lens distance) with two different transmission ratios (coarse and fine drives) is normal for microscopes (that is, very different mechanical conditions); however, this manual focusing is exceptional for photo and film objectives and is only purposeful in a given area of application, namely, for a long focal length telephoto lens for sport (rapid) and nature photography (fine). Photo and film objectives usually have a single distance rotation ring. For rapid focusing, a small rotational angle is advantageous and for sensitive focusing a larger rotational angle is advantageous.

Various manufacturers of objectives offer therefore a range switchover especially for long focal length objectives wherein, with a switch or rotational ring, a distance range can be preselected and thereafter a sharp focusing is made within this range with a distance rotational ring over a larger rotational angle. However, this requires that the photographer must know ab initio in which range the work will be performed.

This is most of all critical at the range boundaries. If the photographer has preselected a range and attempts to sharply focus the object, but cannot attain the point of sharp focus because of the range boundary, the photographer must first change the range and then again search for the point of sharp focus with the distance ring. This is inconvenient and time consuming.

SUMMARY OF THE INVENTION

In view of the foregoing, it is an object of the invention to provide a user-friendly gearing solution for a manual coarse and fine drive for focusing the objective.

The invention provides a user-friendly, rapid and precise focusing. The objective is equipped with two distance adjusting rings which both provide the capability of focusing from the near range to infinity. The first distance adjusting ring (coarse adjusting ring) has a small rotational angle and functions for rapid focusing, for example, to make sport photographs and for coarse prefocusing such as for subjects in nature. The second distance adjusting ring (the fine adjusting ring) can be rotated through a large rotational angle (several rotations of the ring from the near range to infinity) and functions for fine focusing such as when photographing subjects as they are found in nature.

The photographer first attempts to come close to the sharp focusing point with the coarse adjusting ring and then reaches with the hand to the fine adjusting ring in order to precisely adjust the sharp focus.

The coarse adjusting ring directly drives the optical member which is to be displaced linearly. The coarse adjusting ring does this via a thread or a cam (coarse drive). The fine adjusting ring is connected to the coarse adjusting ring via a reduction transmission and a slip clutch. The reduction converts a large rotational angle of the fine adjusting ring into a small rotational angle of the coarse adjusting ring. The distance scale provided on the coarse adjusting ring is therefore also applicable to the indirect drive thereof via the fine adjusting ring.

For higher reductions of the transmission, the fine adjusting ring should not be moved at high rotational speed with the actuation of the coarse adjusting ring. Also, the transmission is self retarding for the translation into the slower rotational speed because the slight frictional torque in the bearing locations of the toothed wheels is sufficient in order to block the transmission. For this reason, a slip clutch is provided between the output wheel of the fine drive and the coarse adjusting ring. The slip clutch is so configured that it transmits the torque of the output wheel of the fine drive to the coarse adjusting ring when the fine adjusting ring is actuated. The transferable torque of the slip clutch must therefore be greater than the drive torque of the coarse drive. The gearing blocks the fine drive when the coarse adjusting ring is actuated and the slip clutch slips. Furthermore, the slip clutch protects the gearing of the fine drive against damage when both coarse and fine adjusting rings are actuated at the same time and when reaching the stops in the end positions with the fine drive.

An especially advantageous embodiment provides for only one planetary gear wheel for transmitting from the sun gear to the output gear wheel. A plurality of such planetary gear wheels can be distributed about the periphery. This is possible when the sun gear wheel and the output gear wheel each have many teeth. The number of teeth differs only slightly and one of the sets of teeth has a profile shift.

In this way, the assembly is facilitated because instead of two pinions, only one pinion is seated on each shaft pin. In the case of two pinions, all planetary gear wheels distributed over the periphery must be precisely adjusted with respect to rotation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
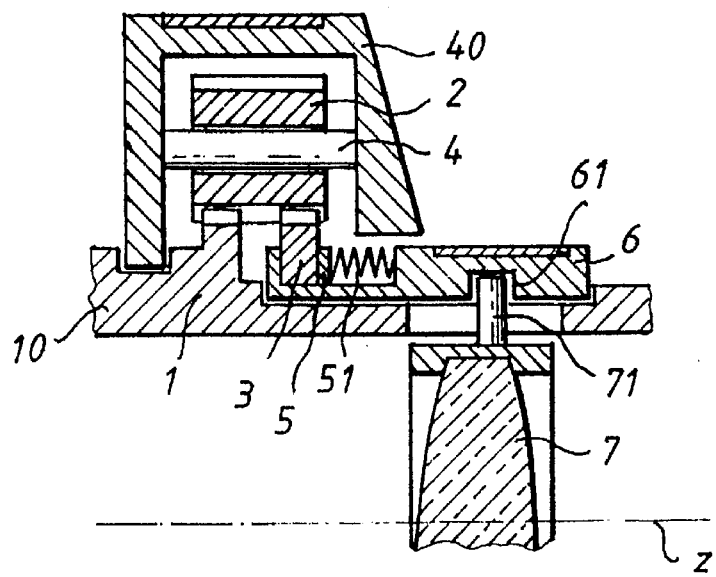
FIG. 1 is a schematic section view taken through a transmission according to the invention.

In FIG. 1, the objective housing 10 includes a fixed sun gear wheel 1 formed thereon and having a positive profile shift. A planetary gear wheel 2 is rotatably journalled on the shaft pin 4 which, in turn, is part of a fine adjusting ring 40 and is rotatably journalled on the objective housing 10 for rotation about the main axis Z of the housing. A plurality of planetary gear wheels 2 is distributed about the periphery and there are preferably three in number. The planetary gear wheel 2 furthermore meshes with the output gear wheel 3 (unmodified gear wheel) which is rotatably connected via a slip clutch 5 to the coarse adjusting ring 6. The slip clutch 5 has a load spring 51. Other varieties of slip clutches 5 can also be used such as those using hydraulic or pneumatic means or media of special or variable viscosity.

The coarse adjusting ring 6 is rotatably journalled on the objective housing 10 to rotate about the main axis Z thereof and has a control cam 61. A cam follower 71 of a slide member 7 engages the control cam 61. A rotational movement of the coarse adjusting ring 6 is converted into a focusing movement along the main axis Z by the cam transmission configured in the manner described above and known per se.

When actuated by the output gear wheel 3, the planetary gear (1, 2, 3, 4) is self-locking as the low friction torques at the fine adjusting ring 40 side of the planetary gear (1, 2, 3, 4) are transformed into a high braking torque because of the high transmission ratio of the planetary gear (1, 2, 3, 4). The slide clutch 5 is suitably adjusted so that the braking torque at the output gear wheel 3 cannot be transmitted from the coarse adjusting ring 6 to the output gear wheel 4. Accordingly, the fine adjusting ring 40 remains stationary when the coarse adjusting ring 6 is actuated.

When the fine adjusting ring 40 is rotated, then the planetary gear wheel 2 rolls on the stationary sun gear 1 and entrains the output gear wheel 3 because of the different tooth number. The output gear wheel 3 is connected to the coarse adjusting ring 6 via the slip clutch 5. The coarse adjusting ring 6 is entrained and effects the displacement of the slide member 7 as described above.

Figure 2:
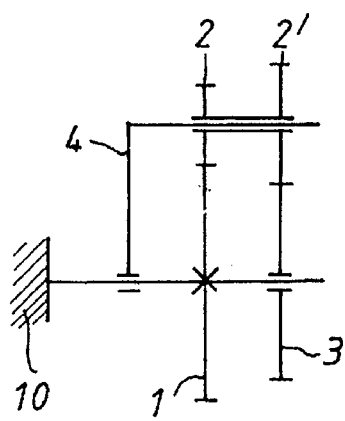
FIG. 2 is a gearing schematic of a planetary transmission in accordance with an embodiment of the invention; and, FIG. 3 is a preferred embodiment of the gearing arrangement of the invention.

The planetary transmission (1, 2, 3, 4) is again shown in FIG. 2 as a gearing schematic in its normal base form. Two planetary gear wheels (2, 2') are mounted on the shaft pin 4 and are rigidly connected to each other. The planetary gear wheels (2, 2') have the number of revolutions $N_4$ and have tooth numbers ($Z_2$, $Z_{2'}$), respectively. The stationary sun gear wheel 1 has the tooth number $Z_1$. The output wheel 3 has the tooth number $Z_3$ and the number of revolutions $N_3$.

The transmission ratio is $N_3/N_4=1-(Z_1 \cdot Z_{2'}/Z_2 \cdot Z_3)$. The output gear wheel 3 (that is, the coarse adjusting ring 6) and the shaft pin 4 (that is, the fine adjusting ring 40) rotate in the same direction when $Z_1$ is less than $Z_3$.

The less the difference of the tooth numbers $Z_1$ and $Z_2$, the greater is the reduction. By advancing the pinion 2 on the gear wheels 1 and 3, the transmission can be adjusted without play. The planetary gear wheels (2, 2') should be three in number and evenly distributed about the periphery so that no one-sided forces can occur in the transmission. For this reason, the tooth number difference of $Z_1$ and $Z_3$ must be a multiple of 3.

Figure 3:
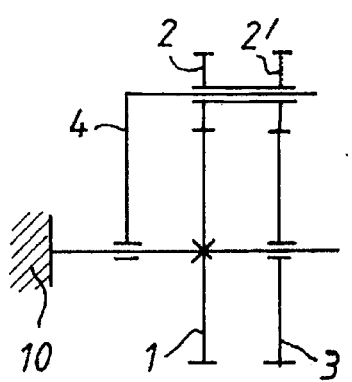

The teeth of the planetary gear wheels (2, 2') must be precisely aligned to each other. In order to avoid this and to simplify the assembly of the transmission, a departure in accordance with FIG. 3 is presented which is already considered in FIG. 1. Here, $Z_2=Z_{2'}$, that is, only a single through pinion is provided as the planetary gear wheel 2 and this pinion meshes with the sun gear wheel 1 and the output gear wheel 3. This is possible because: the sun gear wheel 1 and the output gear wheel 3 have many teeth; the respective tooth numbers ($Z_1$, $Z_3$) of these wheels differ from each other only slightly; and, the sun gear wheel 1 ($Z_1<Z_3$) has a positive profile shift of the tooth profile (the effective running circle diameter in the first pair (sun gear wheel 1/planet gear wheel 2) differs from the effective running circle diameter of the second pair (output gear wheel 3/planetary gear wheel 2), The transmission ratio is then $N_3/N_4=1-Z_1/Z_3$.

A specific embodiment has the following data for the planetary transmission: number of teeth $Z_1=237$ of the sun gear wheel 1, The number of teeth $Z_3=Z_1+3=240$ for the output gear wheel 3 because three planetary gear wheels 2 are distributed about the periphery for transmitting torque, The number of teeth $Z_2=20$ for the planetary gear wheel 2, Module 0.5. The transmission ratio is then $N_3/N_4=1/80$.

The coarse drive comprising the coarse adjusting ring 6 having the control cam 61, cam follower 71 and displacing member 7 is configured as a screw drive having a rotational angle of 120° and a stroke of 20 mm. A rotation on the coarse adjusting ring 6 of 1° therefore effects a displacement of the displacing member 7 of 0.17 mm.

A rotation on the fine adjusting ring 40 of 1° effects only a displacement of the displacing member 7 of 0.002 mm, that is, 1/80 of the above value.

In lieu of the gear wheel transmission, the planetary transmission (1, 2, 3, 4) of FIG. 2 can be provided with a friction wheel transmission. Here, the two planetary gear wheels (2, 2') can be joined to define a bevel gear.

It is understood that the foregoing description is that of the preferred embodiments of the invention and that various changes and modifications may be made thereto without departing from the spirit and scope of the invention as defined in the appended claims.

What is claimed is:

1. An arrangement displacing at least a part of an objective, the arrangement comprising:

a housing defining a longitudinal axis;

a holding member for holding said one part and being displaceable along said axis;

a coarse adjusting ring rotatably mounted on said housing so as to be rotatable by an operator;

conversion means operatively connecting said coarse adjusting ring to said holding member for converting a rotatable movement of said coarse adjusting ring to a linear displacement of said holder and said part along said axis;

a fine adjusting ring mounted on said housing so as to be rotatable relative thereto by an operator through a first rotational angle;

interface means operatively connecting said fine adjusting ring to said coarse adjusting ring to effect a rotation thereof through a second rotational angle when said fine adjusting ring is rotated by the operator;

said interface means including: means for decoupling said fine adjusting ring from said coarse adjusting ring when said coarse adjusting ring is rotated by the operator whereby said fine adjusting ring remains at standstill; and, rotation reduction means for making said second rotational angle of said coarse adjusting ring a fraction of said first rotational angle whereby a fine adjustment of said linear displacement is obtained when said fine adjusting ring is rotated by the operator.

2. A transmission for adjusting at least a part of an objective mounted in an objective housing defining a longitudinal axis, the transmission comprising:

a coarse adjusting ring rotatably journalled on the housing so as to rotate about said longitudinal axis;

a holding member for holding said one part and being displaceable along said axis;

a coarse adjusting ring rotatably mounted on said housing so as to be movably rotatable by an operator;

conversion means operatively connecting said coarse adjusting ring to said holding member for converting a rotational movement of said coarse adjusting ring to a linear displacement of said holder and said part along said axis;

a sun gear wheel fixedly mounted on said housing;

a fine adjusting ring disposed in surrounding spaced relationship to said housing;

planetary gear means rotatably journalled in said fine adjusting ring for meshing with said sun gear wheel;

an output gear wheel rotatably mounted on said coarse adjusting ring and meshed with said planetary gear means whereby a manual rotation of said fine adjusting ring imparts a rotational movement to said output gear wheel; and, slip clutch means interposed between said output gear wheel and said coarse adjusting ring for transmitting a torque from said output gear wheel to said coarse adjusting ring when an operator manually rotates said fine adjusting ring and for decoupling said output gear wheel from said coarse adjusting ring when the operator rotates said coarse adjusting ring.

3. The transmission of claim 2, wherein said planetary gear means comprises a plurality of one-piece pinions uniform throughout and rotatably journalled in said fine adjusting ring so as to mesh with said sun gear wheel and said output gear wheel; and, one of said sun gear wheel and said output gear wheel having a profile shift.

4. An arrangement displacing at least a part of an objective, the arrangement comprising:

a housing defining a longitudinal axis;

a holder for holding said one part and being displaceable along said axis;

a coarse adjusting ring rotatably mounted on said housing so as to be rotatable by an operator;

an angular-to-linear drive operatively connecting said coarse adjusting ring to said holder for converting a rotational movement of said coarse adjusting ring to a linear displacement of said holder and said part along said axis;

a fine adjusting ring mounted on said housing so as to be rotatable relative thereto by an operator through a first rotational angle;

a reduction gear operatively connecting said fine adjusting ring to said coarse adjusting ring to effect a rotation thereof through a second rotational angle when said fine adjusting ring is rotated by the operator;

said reduction gear including: a clutch decoupling said fine adjusting ring from said coarse adjusting ring when said coarse adjusting ring is rotated by the operator whereby said fine adjusting ring remains at standstill; and, rotation reduction gear wheels for making said second rotational angle of said coarse adjusting ring a fraction of said first rotational angle whereby a fine adjustment of said linear displacement is obtained when said fine adjusting ring is rotated by the operator.

5. A transmission for adjusting at least a part of an objective mounted in an objective housing defining a longitudinal axis, the transmission comprising:

a coarse adjusting ring rotatably journalled on the housing so as to rotate about said longitudinal axis;

a holder for holding said one part and being displaceable along said axis;

a coarse adjusting ring rotatably mounted on said housing so as to be movably rotatable by an operator;

an angular-to-linear drive operatively connecting said coarse adjusting ring to said holder for converting a rotational movement of said coarse adjusting ring to a linear displacement of said holder and said part along said axis;

a sun gear wheel fixedly mounted on said housing;

a fine adjusting ring disposed in surrounding spaced relationship to said housing;

planetary gear wheels rotatably journalled in said fine adjusting ring for meshing with said sun gear wheel;

an output gear wheel rotatably mounted on said coarse adjusting ring and meshed with said planetary gear means whereby a manual rotation of said fine adjusting ring imparts a rotational movement to said output gear wheel; and, a slip clutch interposed between said output gear wheel and said coarse adjusting ring for transmitting a torque from said output gear wheel to said coarse adjusting ring when an operator manually rotates said fine adjusting ring and for decoupling said output gear wheel from said coarse adjusting ring when the operator rotates said coarse adjusting ring.

6. The transmission of claim 5, wherein said planetary gear wheels are one-piece pinions uniform throughout and rotatably journalled in said fine adjusting ring so as to mesh with said sun gear wheel and said output gear wheel; and, one of said sun gear wheel and said output gear wheel having a profile shift.

* * * * *